United States Patent [19]

Höfliger

[11] 4,007,942
[45] Feb. 15, 1977

[54] DEVICE FOR THE UPTAKE OF CUP-SHAPED PARTS OF GELATIN CAPSULES

[75] Inventor: Harro Höfliger, Allmersbach, Taunus, Germany

[73] Assignee: Firma Allpack Industrielle Lohnverpackung GmbH & Co. KG, Waiblingen, Germany

[22] Filed: Oct. 21, 1975

[21] Appl. No.: 624,564

[30] Foreign Application Priority Data

Nov. 7, 1974 Germany ............... 2452779

[52] U.S. Cl. .................. 279/3; 82/91; 82/101; 269/21
[51] Int. Cl.² ............... B23B 5/22; B25B 11/00; B23B 5/14
[58] Field of Search ........... 279/3; 269/21; 82/46, 82/91, 101

[56] References Cited
UNITED STATES PATENTS

| 904,679 | 11/1908 | Bruton | 269/21 X |
|---|---|---|---|
| 975,408 | 11/1910 | Fry | 279/3 X |
| 1,430,050 | 9/1922 | Becker | 279/3 |
| 2,732,215 | 1/1956 | Abberle | 279/3 |
| 3,147,017 | 9/1964 | Dunham | 279/3 |
| 3,236,533 | 2/1966 | Mullion | 279/3 |
| 3,292,739 | 12/1966 | Hougland et al. | 279/3 X |
| 3,449,001 | 6/1969 | Mullion | 279/3 X |

FOREIGN PATENTS OR APPLICATIONS

| 20,545 | 5/1964 | Japan | 279/3 |
|---|---|---|---|
| 575,923 | 3/1946 | United Kingdom | 279/3 |
| 601,326 | 5/1948 | United Kingdom | 279/3 |

Primary Examiner—Harrison L. Hinson
Attorney, Agent, or Firm—Wigman & Cohen

[57] ABSTRACT

This disclosure relates to a device for the uptake of capsule parts. The device may include a female member having an internal cavity defined by a contact surface which engages the outer surface of the capsule, or a male member having an outer contact surface which engages the inner surface of the capsule. In each embodiment of the invention the device includes at least one channel opening into the contact surface thereof for supplying a source of underpressure or overpressure to the capsule. The underpressure creates a suction which facilitates the uptake and holding of the capsule, while the overpressure ejects the capsule from the device.

1 Claim, 5 Drawing Figures

DEVICE FOR THE UPTAKE OF CUP-SHAPED PARTS OF GELATIN CAPSULES

This invention relates to the article handling arts, and more particularly to a device for the uptake of the cup-shaped parts of gelatin capsules during at least one step in the process of production of the capsules. The device includes a holder that rotates around its longitudinal axis, into which the capsule parts are introduced from the front end, and which has a contact surface for the capsule parts that conforms essentially to the shape of the capsule parts being taken up.

In known devices of this type, the container is a collet of the sort used in machine tools. One disadvantage of using such a collet is that only capsules with a very low diameter tolerance can be taken up. However, this tolerance is frequently violated, especially in the case of larger capsules. On the other hand, the introduction of a capsule part into the collet is possible only if the collet is standing still, as even very slight friction between the capsule part and the collet leads to an undue heating of the capsule part. Since as a rule, the capsule parts must rotate for the step that is being performed, for as long as they are held by the holder, in order, for instance, to insure that they will be formed to the precise length required, the process is considerably lengthened due to the fact that the holder must be brought to a stop for each change. When a collet is used as in the prior art, the required operating time can be so great that the capsule parts can no longer be economically processed.

It is the primary object of this invention to develop a device for the uptake of the cup-shaped parts of gelatin capsules which can also be used for capsule parts with a relatively extensive range of tolerance with respect to their diameters, and which produces a reduced time requirement for the introduction and removal of the capsule parts therefrom. This object is accomplished in accordance with the invention by providing a device of the aforementioned type that includes a channel which leads into the contact surface, at least in the area that receives the spherical section of the capsule part, which channel can be connected, as wished, with a source of underpressure or a source of overpressure.

The fact that the capsule part is held in the holder not by means of mechanical clamping but by being held by suction onto the contact surface due to the effect of a source of underpressure, eliminates the danger of an undue friction between the contact surface and the capsule part upon introduction of the capsule part into the holder. Therefore, the capsule part can be introduced into the holder even if the latter is rotating. The holding of the capsule part on the contact surface by means of underpressure has the further advantage that the capsule part is drawn into the holder by the suction effect and is automatically brought into correct position. This considerably simplifies the introduction of capsule parts into the holder, and the operation can be performed even using a simple means of conveyance, which considerably reduces the costs of automation. The removal of the capsule parts from the holder is also extremely easy, as for this, it is only necessary to apply a source of overpressure in place of the underpressure. With the help of the overpressure source, a pushing force can be applied to the capsule part so that it is pushed out of the holder. This is also of particular advantage for automation.

The holding of the capsule part on the contact surface by means of underpressure is not, however, very advantageous for adjustment. It is also possible to dimension that part of the contact surface that coincides with the cylindrical section of the capsule part in such a way that even capsule parts with diameters deviating relatively greatly from the nominal value can still be held in the holder in secure and correct position.

The contact surface can be an internal surface or an external surface. In the case of an internal surface, the holder can be a body with a hollow space stretching from one interface in the axial direction into the interior of the element; the surface that circumscribes this hollow space being the contact surface. A particular advantage here is the fact that the capsule parts can be introduced into the holder not only loosely, but also placed on a pin or the like, and that the end zone of the cylindrical section, which is generally the area that needs to be processed, is exposed, so that a ring area that needs to be cut off is located outside the holder and can therefore be taken off without any difficulty.

Insofar as an especially extensive range of tolerance is to be achieved for the diameters of the capsule parts, the contact surface can be made to consist of the inner surface of the individual wall elements that can be moved in radial direction, instead of the surface of a boring or recess. The diameter of the hollow space circumscribed by the wall elements can then be adjusted to the outer diameter of the capsule part. This adjustment can be achieved, for example, with the help of an expandable circular spring, fitted inside the cylindrical section of the contact surface, concentrically to the longitudinal axis of the holder. Such a circular spring, which can for example be a ring of rubber-elastic material, could also be placed in a circular groove in the contact surface and guide and center the capsular part directly.

In the case that the contact surface is an external surface, the holder can be a pin whose external surface is the contact surface. An essential advantage of this form of construction is the simplicity of the construction.

Regardless of whether the contact surface is an internal or external surface, it is advantageous if the channel through which the underpressure or overpressure is applied leads into the center of the spherical portion of the contact surface, as then the force exerted on the capsule part reaches a maximum in the case of both underpressure and overpressure. Normally, however, it is not necessary, for a secure holding of the capsule part and a proper ejection, to create maximum force in the direction of the longitudinal axis of the capsule part. Thus, as a rule, the mouth opening or openings for the underpressure and the overpressure can be located at points offset from the center of the spherical portion. The center can then serve as contact surface for the capsule part. However, an accurate positioning can also be achieved even if the spherical section of the capsule part lies in the holder offset from the center thereof.

In an advantageous form of construction, channels that connect with the underpressure source and the overpressure source also lead into the cylindrical portion of the contact surface, so that a holding force can be applied in this area also.

The nature of the invention may be more clearly understood by reference to the several views illustrated in the attached drawings, the following detailed description thereof, and the appended claimed subject matter. In the drawings:

Figure 1:
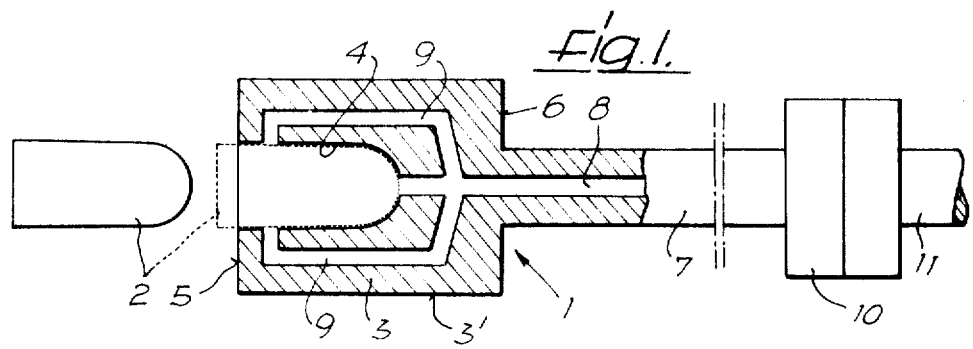
FIG. 1 is a longitudinal cross-sectional view of a first form of construction of the invention.

Referring now to the drawings in detail, there is illustrated in FIG. 1a device 1, comprising a holder 3, for the uptake of cup-shaped capsule parts 2 of gelatin capsules during a processing operation. In order that the capsule part can rotate during the processing around its longitudinal axis, the holder is constructed in the form of a body with a cylindrical external surface 3', and it can therefore be inserted in the jaw chuck of a lathe. As FIG. 1 shows, the holder 3 is fitted with a blind hole-like, central boring 4, which begins at one flat front end 5 and ends, in hemispherical shape, at a distance from the other end 6. The curve of this hemispherical section matches the curve of the hemispherical end section of the capsule part 2. Likewise, the cylindrical portion of the boring 4 is proportioned to the outer diameter of the capsule part 2, but in such a way that even capsule parts with outer diameters that coincide with the upper limit of the tolerance range can be introduced into the boring 4 without friction, or at least without marked friction. The length of the boring 4 depends upon the location on the cylindrical section of the capsule part 2 where the finishing, e.g. a finishing by means of a lathe tool, is to take place.

The holder 3, as shown in FIG. 1, is located at one end of a connection 7 in the form of a bending-resistant tube. This connection is the extension of a central channel 8 stretching from the front end 6 into the interior of the holder 3, which channel opens into the center of the hemispherical section of the internal surface of the boring 4 that serves as the contact surface for the capsule part 2. Symmetrical channels 9 branch off from this central channel 8; these channels 9 open into the boring 4 in the area of its cylindrical section, and, in the first form of construction, in the region adjacent to the front end 5.

The connection 7 leads to a coupling 10, both parts of which are connected so that they rotate in relation to one another, but form an airtight seal. A connecting pipe 11 leads to a valve (not shown), through which it can be connected, as desired, with an underpressure source and an overpressure source. Because of the coupling 10, the connecting pipe 11 does not need to rotate around its longitudinal axis even if the holder 3 and the connection 7 rotate around their longitudinal axis.

In order to bring the capsule parts 2 to a narrowly-tolerated standard of length, the capsule parts are conveyed one after the other in front of the opening of the boring 4, in the position shown in FIG. 1, i.e. with the hemispherical section facing the front end 5. The holder 3 can rotate at the rate necessary for the finishing process, and can, for instance, be inserted in the jaw chuck of a lathe. The connection with the underpressure source is thus established, whereupon air is sucked into the boring 4. The capsule part 2 is sucked into the boring by this suction effect and is brought into the position shown in FIG. 1, in which its hemispherical section fits into the hemispherical base of the boring 4.

Figure 2:
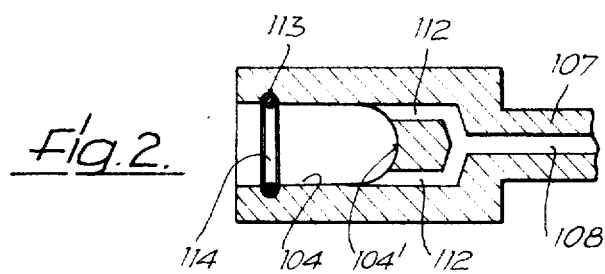
FIG. 2 is a longitudinal cross-sectional view of a second form of construction of the invention.

The form of construction shown in FIG. 2 differs from that of FIG. 1, in that, for one, the central channel 108 connected with the connection 107 ends at a distance from the hemispherical base of the boring 104 and branches off into at least two channels 112, which end outside the center in the hemispherical base of the boring 104. The central portion 104' of the base of the boring 104 can therefore serve as a contact surface, in this form of construction, for the capsule part that is to be taken up, so that tolerances of the curve radius do not take effect on the length of the section lying inside the boring. The ejection of the capsule parts is possible, as in the first form of construction, by connecting the channel 108 with an overpressure source, so that a force component of the overpressure forms at the mouth openings of the channels 112, said component running parallel to the longitudinal axis of the boring 104.

Another difference from the first form of construction consists in the fact that the diameter of the boring 104 is somewhat greater than the outer diameter of the capsule part, and that there is a circular groove 113 cut into the cylindrical wall of the boring 104, into which a circular spring 114 is placed. This circular spring consists, in this form of construction, of a rubber-elastic material and has an internal diameter proportioned to the smallest possible outer diameter of the capsule parts. The circular spring 114 is expanded by the necessary degree for taking up capsule parts with a larger outer diameter. The friction between the circular spring and the capsule parts upon introduction and ejection can be kept so slight that it has no disturbing effect.

Figures 3, 4:
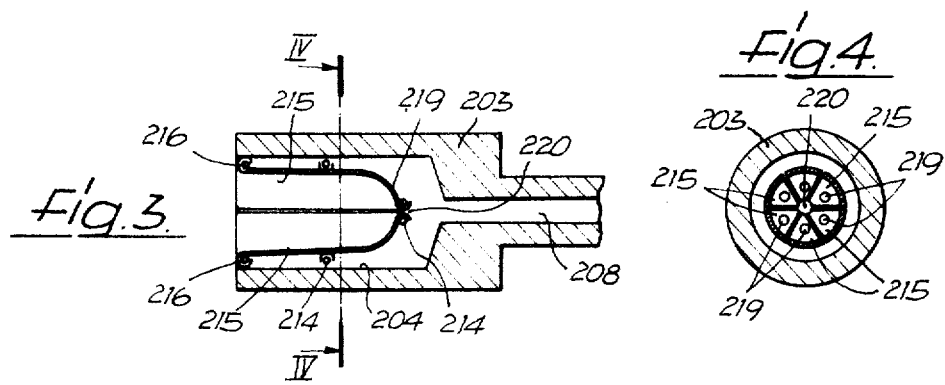
FIG. 3 is a longitudinal cross-sectional view of a third form of construction of the invention.
FIG. 4 is a sectional view taken along line IV—IV of FIG. 3.

FIGS. 3 and 4 show another possibility of adapting the holder to relatively large tolerances in the outer diameter of the capsule parts. The holder 203, which has, as in the previously described forms of construction, a cylindrical external surface, has in this form of construction a central boring 204, the diameter of which is considerably larger than the external diameter of the capsule parts that are to be taken up. This is required by the fact that the contact surface for the capsule parts is not the wall of the boring 204, but rather the inner surface of lamina 215 arranged concentrically to the longitudinal axis of the holder 203 and extending in the direction of this longitudinal axis. These lamina are fixed at one end to pivot around an axis 216, in the area of the mouth opening of the boring 204, in such a way that they pivot in a radial direction. The lamina 215 are adapted to the shape of the capsule parts to be taken up, both in the peripheral direction and in the axial direction. One or more circular springs 214 hold the lamina 215 in the position shown in FIG. 3, in which the smallest possible inner diameter of the hollow space 204 circumscribed by the lamina is indicated. If capsule parts of larger diameter are introduced, then the lamina 215 are pivoted outward to the necessary degree. The largest outer diameter that the capsule parts may have in order still to be able to be introduced into the holder 203 is determined by the diameter of the hollow space 204, circumscribed by the lamina 215, in the area of the mouth opening.

The section of the lamina 215 that is curved inward has a boring 219. Also provided is a central opening 220. The underpressure or overpressure prevailing in the boring 204 and in the channel 208 therefore takes effect not only through the crack between the lamina 215, but also through the boring 219 and the central opening 220. Thus, this form of construction, too, guarantees a reliable ejection of the capsule parts. However, the cracks between the lamina 215 offer no impediment to the holding of the capsule part, since they exert a holding force in the area of the cylindrical section of the capsule parts, similar to that described for the channels 9 of the first form of construction shown in FIG. 1.

Figure 5:
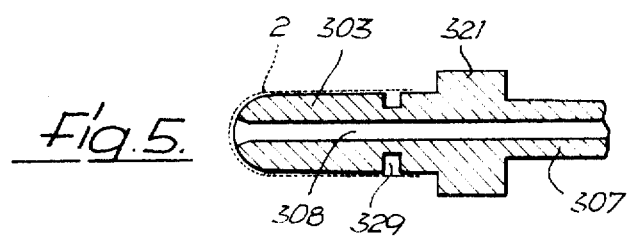
FIG. 5 is a longitudinal cross-sectional view of a fourth form of construction of the invention.

In the case of the form of construction illustrated in FIG. 5, the holder 303 is a cylindrical pin fitted onto a trunk 321 that makes it possible to insert it into a jaw chuck or the like. This trunk does not, however, as shown in FIG. 5, require a larger outer diameter than that of the pin. The diameter of the pin and its semi-circular end section are proportioned to the shape and size of the capsule part 2 to be taken up, which part, as FIG. 5 shows, is pushed over the pin. A central channel 308 pierces the holder 303 and leads to the center of the semi-circular end. The channel 308 can be connected, as desired, with an underpressure source or an overpressure source by means of a connection 307. The capsule part 2 can therefore be held with its hemispherical base in contact with the semi-circular outer surface of the holder 303 by means of underpressure. As a rule, it is sufficient to exert a suction effect only on the base of the capsule part. However, it is of course also possible to provided channels leading in radial direction from the channel 308, through which a suction effect can also be exerted on the cylindrical sections of the capsule part. By connecting the channel 308 with a source of overpressure, the capsule part can be ejected.

In the case that the capsule part must be shortened to a certain length, the holder 303 may have a circular groove 329 in that area where the tool must be applied to perform a separating cut, into which groove the tool can enter.

While only preferred embodiments of the invention have been specifically illustrated and described herein, it is to be understood that minor modifications could be made therein without departing from the spirit of the invention.

I claim:

1. A device for the uptake of cup-shaped elements, particularly capsule parts of gelatin capsules during manufacture thereof, said elements having a cylindrical body portion and a hemispherical end portion, comprising a holder adapted to rotate about its longitudinal axis, wherein said holder is a body having an internal hollow chamber opening at one end to the exterior thereof, said holder including radially movable wall elements mounted within said chamber, said wall elements serving as a contact surface having a cylindrical portion and a hemispherical portion conforming to the shape of said elements, said holder further including resilient means for radially inwardly biassing said movable wall elements, said device further comprising channel means extending through said holder and communicating at least with said hemispherical portion of said contact surface, and means for connecting said channel means with either a source of underpressure or a source of overpressure.

* * * * *